United States Patent
Shimizu et al.

(10) Patent No.: US 11,521,404 B2
(45) Date of Patent: Dec. 6, 2022

(54) INFORMATION PROCESSING APPARATUS AND NON-TRANSITORY COMPUTER READABLE MEDIUM FOR EXTRACTING FIELD VALUES FROM DOCUMENTS USING DOCUMENT TYPES AND CATEGORIES

(71) Applicant: FUJIFILM BUSINESS INNOVATION CORP., Tokyo (JP)

(72) Inventors: Junichi Shimizu, Kanagawa (JP); Shigeru Okada, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/838,093

(22) Filed: Apr. 2, 2020

(65) Prior Publication Data

US 2021/0097272 A1 Apr. 1, 2021

(30) Foreign Application Priority Data

Sep. 30, 2019 (JP) .............................. JP2019-178597

(51) Int. Cl.
*G06K 9/00* (2022.01)
*G06V 30/413* (2022.01)
(Continued)

(52) U.S. Cl.
CPC ............ *G06V 30/413* (2022.01); *G06V 10/40* (2022.01); *G06V 30/10* (2022.01)

(58) Field of Classification Search
CPC .. G06K 9/00456; G06K 9/46; G06K 2209/01; G06K 9/6201; G06K 9/6268;
(Continued)

(56) References Cited

U.S. PATENT DOCUMENTS 4,760,247 A * 7/1988 Keane .................. G07C 15/005
235/456
5,140,139 A * 8/1992 Shepard ................. G09B 7/066
235/456
(Continued)

FOREIGN PATENT DOCUMENTS

CN 1153955 A * 7/1997 ......... G06K 9/00469
EP 0571308 A1 * 5/1993 .............. B43M 7/02
(Continued)

OTHER PUBLICATIONS

Evaluating Document Clustering for Interactive Information Retrieval, Anton Leuski, ACM, 2001, pp. 33-40 (Year: 2001).*

(Continued)

*Primary Examiner* — Jayesh A Patel
(74) *Attorney, Agent, or Firm* — Oliff PLC (57) ABSTRACT

An information processing apparatus includes a processor. The processor is configured to: determine a document type of a document by using a title of the document, the document being classified as the determined document type, the title representing a category of the document and being extracted from a read image of the document; and extract a field value from the document by using an item of definition information prepared in accordance with the determined document type from among items of definition information. The definition information is prepared for each document type and defines a rule for extracting a field value from a document.

9 Claims, 7 Drawing Sheets

(51) Int. Cl.
*G06V 10/40* (2022.01)
*G06V 30/10* (2022.01)

(58) Field of Classification Search
CPC ...... G06V 30/413; G06V 10/40; G06V 30/10; G06V 20/62; G06V 30/416
See application file for complete search history.

(56) References Cited

U.S. PATENT DOCUMENTS

| | | | | |
|---|---|---|---|---|
| 5,438,630 A | * | 8/1995 | Chen | G06K 9/6297 382/196 |
| 5,542,007 A | * | 7/1996 | Chevion | H04N 1/4177 382/232 |
| 6,035,061 A | * | 3/2000 | Katsuyama | G06V 30/416 382/101 |
| 6,169,998 B1 | * | 1/2001 | Iwasaki | G06F 16/5846 715/204 |
| 6,442,555 B1 | * | 8/2002 | Shmueli | G06F 16/355 |
| 6,481,624 B1 | * | 11/2002 | Hayduchok | B07C 5/344 235/493 |
| 6,885,769 B2 | * | 4/2005 | Morita | G06Q 40/00 715/272 |
| 6,963,665 B1 | * | 11/2005 | Imaizumi | G06V 30/1444 382/229 |
| 7,213,205 B1 | * | 5/2007 | Miwa | G06F 16/93 707/999.005 |
| 7,236,653 B2 | * | 6/2007 | Constantin | G06V 10/22 382/306 |
| 8,037,065 B1 | * | 10/2011 | Brin | G06F 16/2425 707/711 |
| 8,254,681 B1 | * | 8/2012 | Poncin | G06F 40/20 382/229 |
| 8,891,871 B2 | * | 11/2014 | Eguchi | G06V 30/1444 382/173 |
| 8,931,044 B1 | * | 1/2015 | Subramanian | G06F 21/6245 726/28 |
| 10,127,673 B1 | * | 11/2018 | Ben Khalifa | G06V 30/414 |
| 10,152,648 B2 | * | 12/2018 | Filimonova | G06V 30/1916 |
| 2001/0018698 A1 | * | 8/2001 | Uchino | G06F 16/30 707/E17.058 |
| 2003/0009420 A1 | * | 1/2003 | Jones | G06Q 40/00 705/39 |
| 2003/0140044 A1 | * | 7/2003 | Mok | G16H 30/20 |
| 2003/0163785 A1 | * | 8/2003 | Chao | G06F 40/103 715/251 |
| 2003/0190094 A1 | * | 10/2003 | Yokota | G06V 30/1444 382/286 |
| 2004/0143547 A1 | * | 7/2004 | Mersky | G06Q 20/102 705/40 |
| 2008/0288535 A1 | * | 11/2008 | Zhang | G06F 16/951 707/E17.046 |
| 2011/0032556 A1 | * | 2/2011 | Mishima | G06V 30/416 358/1.11 |
| 2011/0161168 A1 | * | 6/2011 | Dubnicki | G06F 16/353 705/14.49 |
| 2011/0188759 A1 | * | 8/2011 | Filimonova | G06K 9/626 382/195 |
| 2012/0179709 A1 | * | 7/2012 | Nakano | G06F 16/30 707/769 |
| 2013/0177246 A1 | * | 7/2013 | Stokes | G06V 10/273 382/182 |
| 2014/0064621 A1 | * | 3/2014 | Reese | G06F 16/93 382/190 |
| 2014/0177961 A1 | * | 6/2014 | Oda | G06V 10/235 382/187 |
| 2014/0184607 A1 | * | 7/2014 | Toyoshima | G06T 11/206 345/440 |
| 2015/0058374 A1 | * | 2/2015 | Golubev | G06V 10/23 707/769 |
| 2016/0055375 A1 | * | 2/2016 | Neavin | H04N 1/00 382/218 |
| 2016/0080587 A1 | * | 3/2016 | Ando | H04N 1/32587 358/1.15 |
| 2016/0119506 A1 | * | 4/2016 | Namihira | H04N 1/00328 358/426.01 |
| 2016/0307067 A1 | * | 10/2016 | Filimonova | G06V 30/1916 |
| 2017/0124390 A1 | * | 5/2017 | Koyanagi | G06V 30/1448 |
| 2020/0302208 A1 | * | 9/2020 | Hoehne | G06V 30/40 |

FOREIGN PATENT DOCUMENTS

| | | | | |
|---|---|---|---|---|
| EP | 0571308 A1 | * | 11/1993 | |
| EP | 0790573 A1 | * | 7/1996 | |
| EP | 0790573 A1 | * | 8/1997 | ............ G06K 9/20 |
| JP | 2001-202466 A | | 7/2001 | |
| JP | 2010-3155 A | | 1/2010 | |
| JP | 2013-142955 A | | 7/2013 | |
| KR | 2019091101 A | * | 8/2019 | |
| WO | WO-2004095195 A2 | * | 11/2004 | ........ G06F 17/30011 |
| WO | WO-2008058871 A1 | * | 5/2008 | ............ E04H 1/04 |

OTHER PUBLICATIONS

Improving text categorization using the importance of sentences, Youngjoong Ko et al., Elsevier, 2002, pp. 65-79 (Year: 2002).*
Advanced Data Clustering Methods of Mining Web Documents, Samuel Sambasivam et al., 2006, pp. 563-579 (Year: 2006).*
Account Identification for Automatic Data Processing, Anthony G. Oettinger, ACM, 1957, pp. 1-5 (Year: 1957).*
User-defined template for identifying document type and extracting information from documents, Tsukasa Kochi et al., IEEE, 1999, pp. 1-4 (Year: 1999).*

* cited by examiner

| FORM TYPE | TITLE |
|---|---|
| INVOICE | INVOICE, INVOICE FOR YOUR PAYMENT, ... |
| QUOTATION | QUOTATION, PRICE QUOTE, SALES QUOTATION, ... |
| ⋮ | |

INFORMATION PROCESSING APPARATUS AND NON-TRANSITORY COMPUTER READABLE MEDIUM FOR EXTRACTING FIELD VALUES FROM DOCUMENTS USING DOCUMENT TYPES AND CATEGORIES

CROSS-REFERENCE TO RELATED APPLICATIONS

This application is based on and claims priority under 35 USC 119 from Japanese Patent Application No. 2019-178597 filed Sep. 30, 2019.

BACKGROUND

(i) Technical Field

The present disclosure relates to an information processing apparatus and a non-transitory computer readable medium.

(ii) Related Art

It may be desirable to automatically extract a field value corresponding to a specific field from a document. For example, if a document is a form, such as an invoice, the format of the form is usually preset by an issuer, such as a company. If the format of the form is analyzed to identify the area of the form where a field value is described, a field value may automatically be extracted from a form having the same format as the analyzed form.

Typically, a field value corresponding to a certain field of a form is described near a field name of this field on the form. If the field name of the field is the amount of money, for example, a field value corresponding to this field, that is, the number representing the amount of money, is highly likely to be positioned immediately under a character string representing the field name "amount of money" or on the right side of the character string. It is thus possible to automatically extract a field value as a result of searching for the character string "amount of money" from a read image of the form.

In both the above-described cases of the related art, information which defines a rule for extracting a field value, for example, is prepared for each document category.

Examples of the above-described related art are disclosed in Japanese Unexamined Patent Application Publication Nos. 2001-202466 and 2013-142955.

SUMMARY

Aspects of non-limiting embodiments of the present disclosure relate to making it possible to extract a field value without preparing definition information, which defines a rule for extracting a field value from a document, for each document category.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to: determine a document type of a document by using a title of the document, the document being classified as the determined document type, the title representing a category of the document and being extracted from a read image of the document; and extract a field value from the document by using an item of definition information prepared in accordance with the determined document type from among items of definition information. The definition information is prepared for each document type and defines a rule for extracting a field value from a document.

BRIEF DESCRIPTION OF THE DRAWINGS

Exemplary embodiments of the present disclosure will be described in detail based on the following figures, wherein.

DETAILED DESCRIPTION

Exemplary embodiments of the disclosure will be described below with reference to the accompanying drawings. In the following exemplary embodiments, a form will be discussed as an example of a document.

First Exemplary Embodiment

Figure 1:
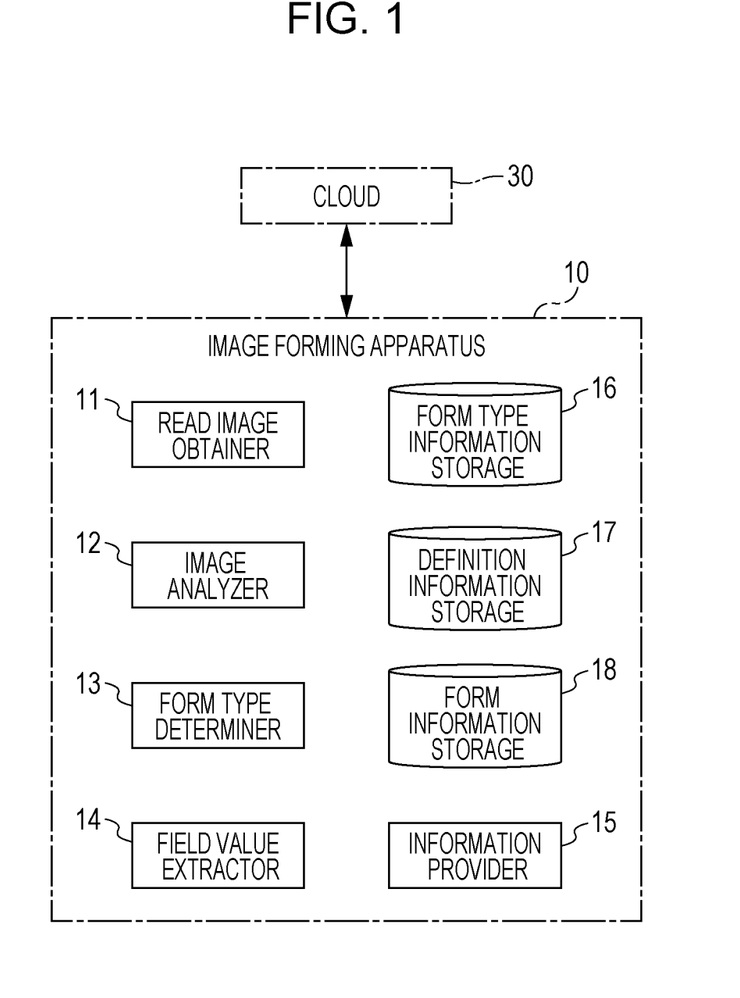
FIG. 1 is a block diagram of an image forming apparatus according to a first exemplary embodiment.
Figure 2:
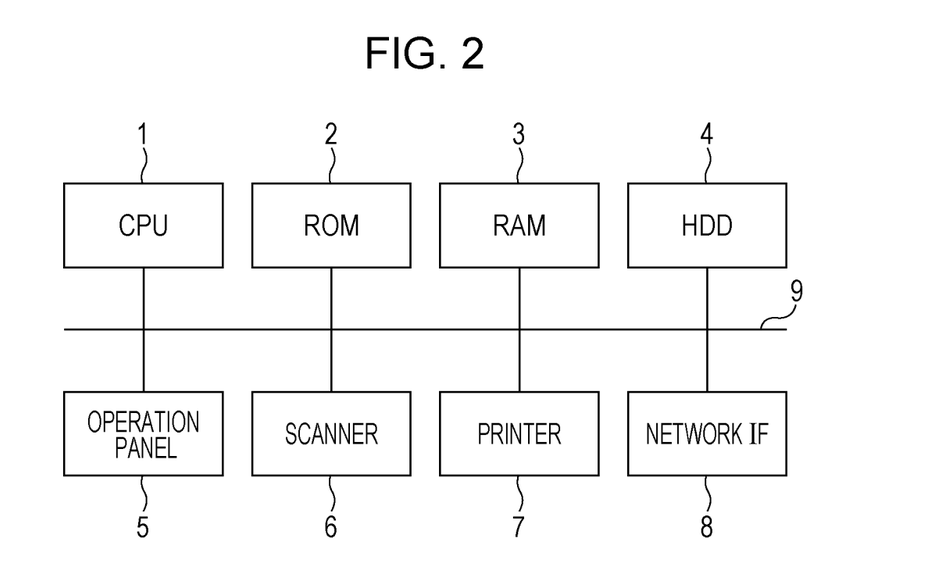
FIG. 2 is a block diagram of the hardware configuration of the image forming apparatus according to the first exemplary embodiment.

FIG. 1 is a block diagram of an image forming apparatus 10 according to a first exemplary embodiment. FIG. 2 is a block diagram of the hardware configuration of the image forming apparatus 10. The image forming apparatus 10 is a multifunction device having various functions, such as a copy function and a scan function, and including an information processing apparatus according to an exemplary embodiment of the disclosure. In the image forming apparatus 10 shown in FIG. 2, a read only memory (ROM) 2 stores various programs for controlling the image forming apparatus 10 and for implementing distinctive processing functions of the first exemplary embodiment, which will be discussed later. A central processing unit (CPU) 1 controls the operations and functions of various mechanisms, such as a scanner 6 and a printer 7, installed in the image forming apparatus 10 in accordance with the programs stored in the ROM 2. A random access memory (RAM) 3 is used as a work memory for the CPU 1 to execute the programs and also as a communication buffer. A hard disk drive (HDD) 4 stores digital documents, for example, read by the scanner 6. An operation panel 5 receives an instruction from a user and displays information. The scanner 6 reads a document set by a user and stores the read document in the HDD 4, for example, as a digital document. A printer 7 prints an image on an output sheet in accordance with an instruction from a control program executed by the CPU 1. A network interface (IF) 8, which connects to a network, is used for sending and receiving digital data to and from external devices and for allowing external devices to make access to the image forming apparatus 10 via a browser. An address data bus 9 connects to the various mechanisms controlled by the CPU 1 and performs data communication with them.

As shown in FIG. 1, a cloud 30 is connected to the image forming apparatus 10 so that they can communicate with each other via a network (not shown), such as the Internet. The image forming apparatus 10 of the first exemplary embodiment includes a read image obtainer 11, an image analyzer 12, a form type determiner 13, a field value extractor 14, an information provider 15, a form type information storage 16, a definition information storage 17, and a form information storage 18. The elements of the image forming apparatus 10 that are not discussed in the first exemplary embodiment are not shown.

The read image obtainer 11 obtains a read image of a form read by the scanner 6. The image analyzer 12 analyzes the read image obtained by the read image obtainer 11 and extracts character strings described in the form. The form type determiner 13 extracts a title representing a category of the form from the character strings extracted by the image analyzer 12 and determines a form type of this form from the extracted title. The field value extractor 14 extracts a field value from the read image of the form. In this case, the field value extractor 14 extracts a field value by using an item of definition information prepared in accordance with the form type determined by the form type determiner 13 from among items of definition information stored in the definition information storage 17. The field value extractor 14 then stores form information including information concerning the extracted field value in the form information storage 18. The information provider 15 provides the form information to a user.

"Form category" (also called the category of a form) and "form type" (also called the type of form) will be explained below.

A form category can be determined from a form provider (also called a form issuer) and a form receiver (also called a form addressee) and from the form type of this form. A form type is a group of forms that can be classified according to the type of form, though it may also be called a form category. A form type can be determined relatively exclusively by an administrator of forms, for example. Examples of the form types are invoices, quotations, order sheets, receipts, and contracts. For example, an invoice received by company A from company B and an invoice received by company A from company C are invoices issued by the different issuers and are thus regarded as different categories of invoices. These invoices are however classified as the same form type, which is the invoice. In the first exemplary embodiment, "form category" and "form type" are clearly distinguished from each other in this manner.

Figure 3:
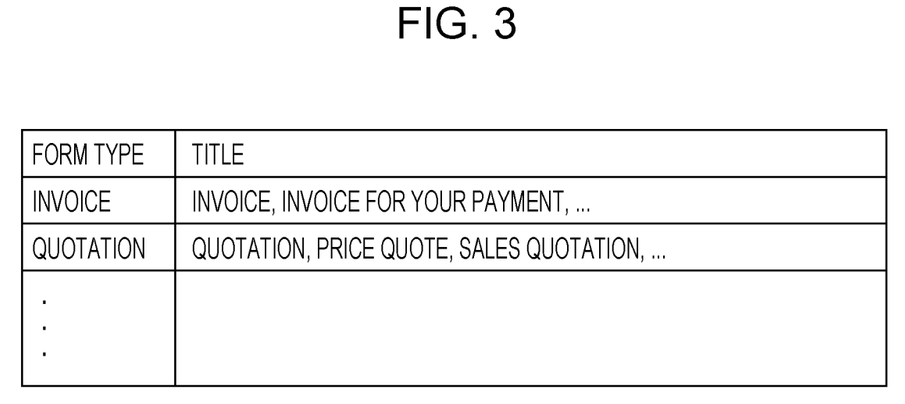
FIG. 3 is a table illustrating an example of the data structure of form type information stored in a form type information storage in the first exemplary embodiment.

FIG. 3 is a table illustrating an example of the data structure of form type information stored in the form type information storage 16 in the first exemplary embodiment. The form type information is form type classification information indicating form types and form titles associated with each other. Each title is classified as one of the form types. The form type information is set in advance by the administrator of forms, for example. The form type classification information corresponds to document type classification information. If multiple forms are of the same form type but belong to different form categories, the titles concerning these forms may be described in a different manner. It is now assumed that the form type is a quotation. The titles of quotations can be decided largely at the discretion of individual issuers, such as companies. Hence, character strings representing the titles of quotations created by individual companies are not necessarily the same and may vary, such as "quotation", "price quote", and "sales quotation". That is, orthographic variants (words spelled differently but having the same meaning) may occur in the description of individual titles. As a title in the form type information, it is desirable to set titles that may fall under the corresponding form type, in particular, titles that may be set by individual issuers, such as companies.

In the definition information storage 17, definition information which is set for each form type in advance is stored. The definition information indicates a rule defined for extracting one or multiple field values from a form classified as a certain form type. In the first exemplary embodiment, definition information is generated, not for each form category, but for each form type. The field value extractor 14 extracts a field value from a read image of a form by using the definition information associated with the form type of this form.

In the form information storage 18, field value information generated for each form by the field value extractor 14 is stored. The field value information is generated by associating identification information of a form (such as a form ID) and the type of this form with a pair of a field value extracted by the field value extractor 14 and a field name corresponding to this field value.

The read image obtainer 11, the image analyzer 12, the form type determiner 13, the field value extractor 14, and the information provider 15 of the image forming apparatus 10 are implemented by collaborative work between a computer installed in the image forming apparatus 10 and a program executed by the CPU 1 of the computer. The form type information storage 16, the definition information storage 17, and the form information storage 18 are implemented by the HDD 4 of the image forming apparatus 10. Alternatively, the RAM 3 may be used or an external storage may be used via a network.

The programs used in the first exemplary embodiment may be provided as a result of being stored in a computer readable recording medium, such as a compact disc (CD)-ROM or a universal serial bus (USB) memory, as well as being provided by a communication medium. As a result of the programs provided by a communication medium or a recording medium being installed into a computer and being sequentially executed by the CPU 1 of the computer, various operations can be executed.

Figure 4:
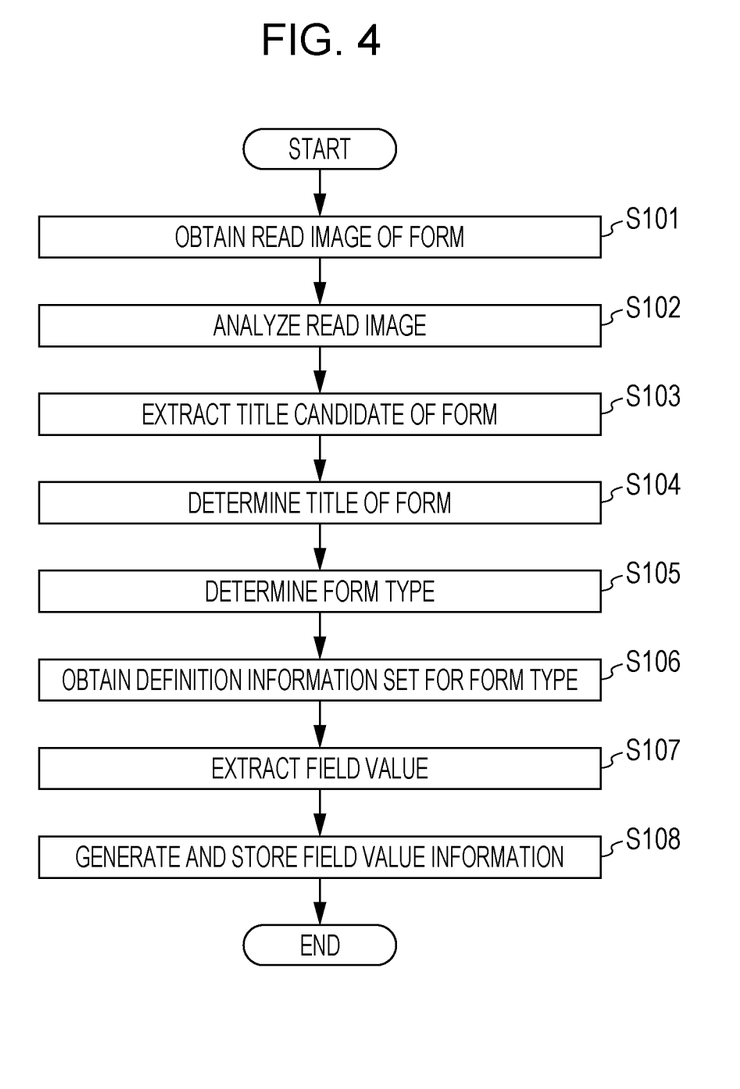
FIG. 4 is a flowchart illustrating field value extracting processing according to the first exemplary embodiment.

Processing for extracting a field value from a read image of a form in the first exemplary embodiment will now be described below with reference to the flowchart of FIG. 4.

When a form is read by the scanner 6 in response to a user instruction, the read image obtainer 11 obtains the read image of this form in step S101. In step S102, the image analyzer 12 analyzes the read image and extracts character strings described in the form. More specifically, the image analyzer 12 extracts character strings from the read image by using the optical character recognition (OCR) technology. A character string is a set of characters, and only one character may form a set of characters.

Then, in step S103, the form type determiner 13 extracts a character string that matches predetermined extracting conditions as a candidate of the title of this form, from among the character strings extracted by the image analyzer 12. Typically, the title of a form is a character string positioned at the top portion of the form and is described in a relatively large font size. Conditions concerning the position of a title on a form and the attribute of characters forming a title are set as the predetermined extracting conditions in advance. Then, a character string that matches the predetermined extracting conditions is extracted as a title candidate. The form type determiner 13 then refers to the form type information storage 16 and checks the character string extracted as a title candidate against each of the titles set in the form type information. If a title that matches the character string extracted as a title candidate is found, the form type determiner 13 determines this title as the title of the form in step S104, and also determines the form type associated with this title in the form type information as the form type of this form in step S105. In the first exemplary embodiment, the form type of a form is determined based on the description of the title of this form.

If the character string extracted as a title candidate does not match any of the titles in the form type information, the form is classified as "others".

After the form type is determined in step S105, in step S106, the field value extractor 14 obtains definition information set for this form type by reading it from the definition information storage 17. Then, in step S107, the field value extractor 14 extracts a field value concerning a field indicated in this definition information from the read image. If the position and the region of a field value on the form are defined in the definition information, the field value extractor 14 refers to the definition information and extracts the field value based on the position and region in the read image of the form. If, instead of the position and the region of a field value on the form, the field name corresponding to a field value is defined in the definition information, the field value extractor 14 refers to the definition information and identifies the position of the field name from the read image of the form and extracts a character string positioned in the vicinity of the field name as the field value. If the pattern of a field value, such as the data type representing a field value, is defined in the definition information, the field value extractor 14 refers to the definition information and extracts a character string that matches this data type from the read image of the form as the field value. If the field value is a date, for example, the data type representing the field value is "YYYY/MM/DD". The field value extractor 14 extracts a character string that matches the data type "YYYY/MM/DD" as the field value. If the field value is the amount of money, the field value extractor 14 extracts a numeric string following "¥ (the symbol of Japanese yen)" as the field value. Processing for extracting a field value by the field value extractor 14 may be executed by using an existing technology.

In step S108, the field value extractor 14 generates field value information by associating the field value extracted as described above with the field name of the field, and stores the field value information in the form information storage 18. More specifically, the field value extractor 14 generates field value information indicating the identification information concerning a form, the form type of this form, and the field name and field value of a field extracted from this form, and stores the field value information in the form information storage 18.

The information provider 15 provides the generated field value information to a post-process that processes the form or to the cloud 30 for data management. The information provider 15 provides the field value information in any manner. For example, the field value information may be sent as a file format via a network or by using a certain function, such as email.

Second Exemplary Embodiment

In the above-described first exemplary embodiment, forms are processed one by one. For the sake of work efficiency, multiple forms may be processed together at the end of each month, for example. In a second exemplary embodiment, when multiple forms are continuously read by the scanner 6 in response to a user instruction, the forms are sorted into groups so that related forms can be set into the same group and are stored.

Figure 5:
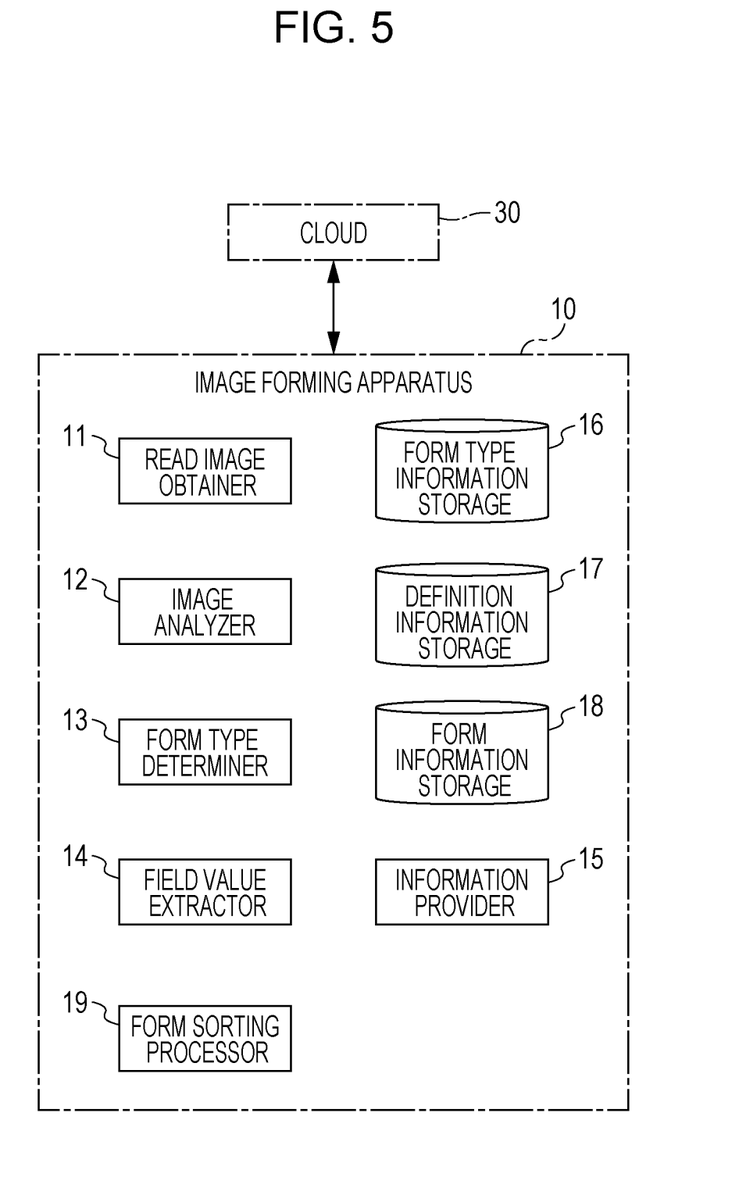
FIG. 5 is a block diagram of an image forming apparatus according to a second exemplary embodiment.

FIG. 5 is a block diagram of an image forming apparatus 10 according to the second exemplary embodiment. Elements identical to those of the first exemplary embodiment are designated by like reference numerals, and an explanation thereof may be omitted. The image forming apparatus 10 according to the second exemplary embodiment includes a form sorting processor 19 in addition to the elements of the first exemplary embodiment.

When the read images of multiple forms are continuously obtained, the form type determiner 13 determines the form type of each form, and then, the form sorting processor 19 sorts the multiple forms based on the form types. The form sorting processor 19 is implemented by collaborative work between a computer installed in the image forming apparatus 10 and a program executed by the CPU 1 of the computer.

Figure 6:
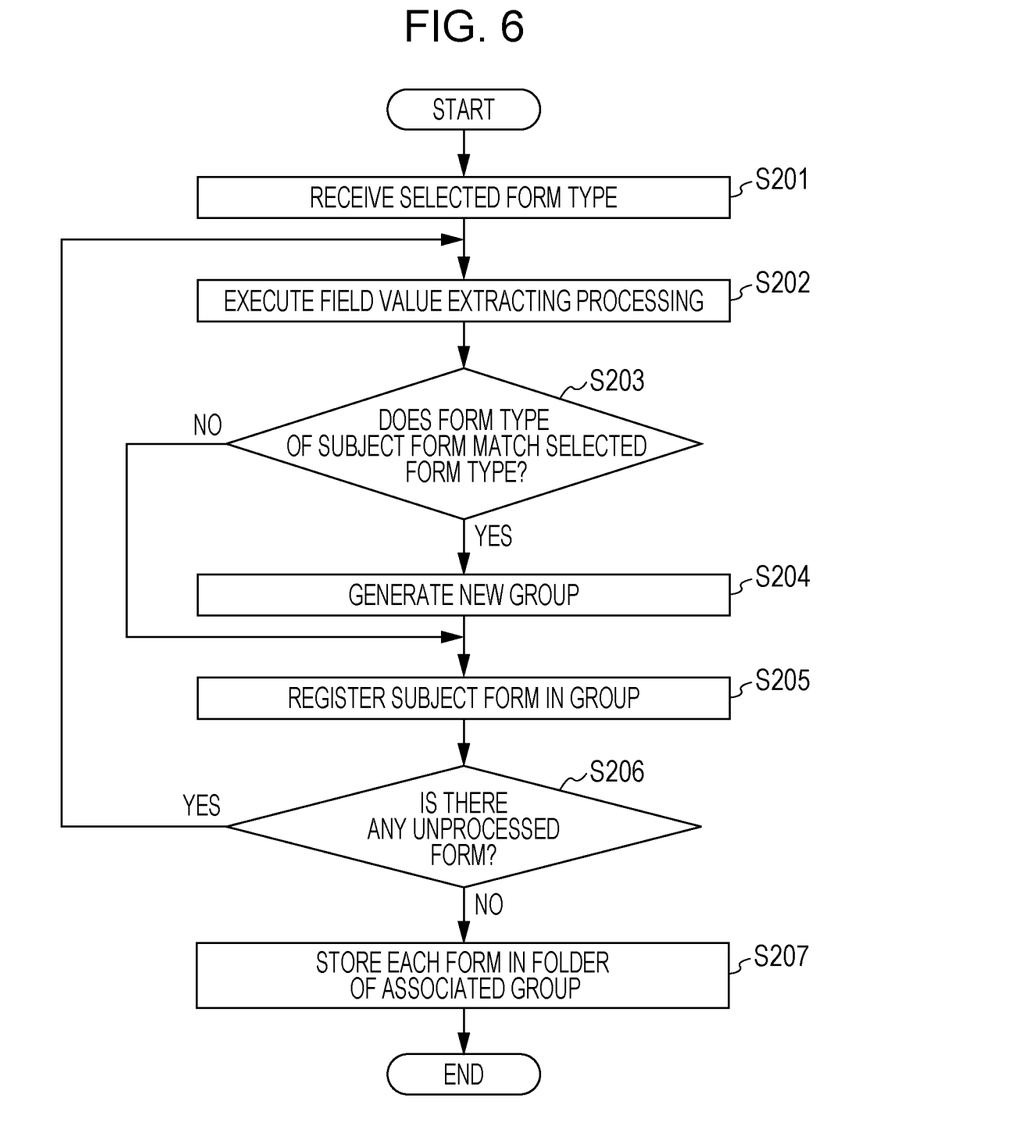
FIG. 6 is a flowchart illustrating form sorting processing according to the second exemplary embodiment.

Form sorting processing in the second exemplary embodiment will now be described below with reference to the flowchart of FIG. 6.

To read multiple forms by using the scanner 6 and sort them, a user first performs a predetermined operation to display a screen for selecting a form type on the operation panel 5. The user then selects a form type, which serves as a sorting reference, on the screen. Then, in step S201, the image forming apparatus 10 receives the form type selected by the user.

Subsequently, the user sets multiple forms on an auto document feeder (ADF) of the image forming apparatus 10 and causes the ADF to sequentially read the forms. When the image forming apparatus 10 has read one form, in step S202, it executes field value extracting processing discussed in the first exemplary embodiment. Details of this processing are the same as those of the first exemplary embodiment as discussed with reference to FIG. 3, and an explanation thereof will be omitted.

It is then judged in step S203 whether the form type of the read form (hereinafter called the subject form) matches the selected form type. If the two form types match each other (YES in step S203), the form sorting processor 19 generates a new group to sort and manage forms in step S204. Then, in step S205, the form sorting processor 19 registers the subject form in the generated group. It is then judged in step S206 whether there is any form which has not been processed. If an unprocessed form is left (YES in step S206), the process returns to step S202, and field value extracting processing is executed on a form subsequently read by the ADF.

If the form type of the subject form does not match the selected form type (NO in step S203), it means that a group for this form is already created, and the form sorting processor 19 registers the subject form in the same group as that in which the previous form is registered. In this manner, the subject form is sorted into the same group as the previous form of the selected form type.

If the form type of another subject form matches the selected form type (YES in step S203), the form sorting processor 19 generates a new group in step S204, as discussed above. That is, the form sorting processor 19 generates a group different from the previously generated group and registers the subject form in the new group in step S205.

The above-described processing is repeatedly executed until all the forms are processed. Then, the result of step S206 becomes NO. In step S207, the form sorting processor 19 stores each form in a folder of an associated group. Individual folders are stored in the form information storage 18.

As described above, in the second exemplary embodiment, continuously read multiple forms are sorted so that a set of forms in a range from a form having a selected form type until a form positioned immediately before another form having the selected form type or until the final form (that is, the form read for the last time among the multiple forms), belong to the same group.

Even among forms sorted into the same group, each form is processed in accordance with its form type. That is, concerning a form which does not match a selected form type, the field value extractor 14 extracts a field value from the read image of this form by using definition information set for the form type of this form instead of that for the selected form type.

The above-described form sorting processing will be explained through illustration of a specific example.

Figure 7:
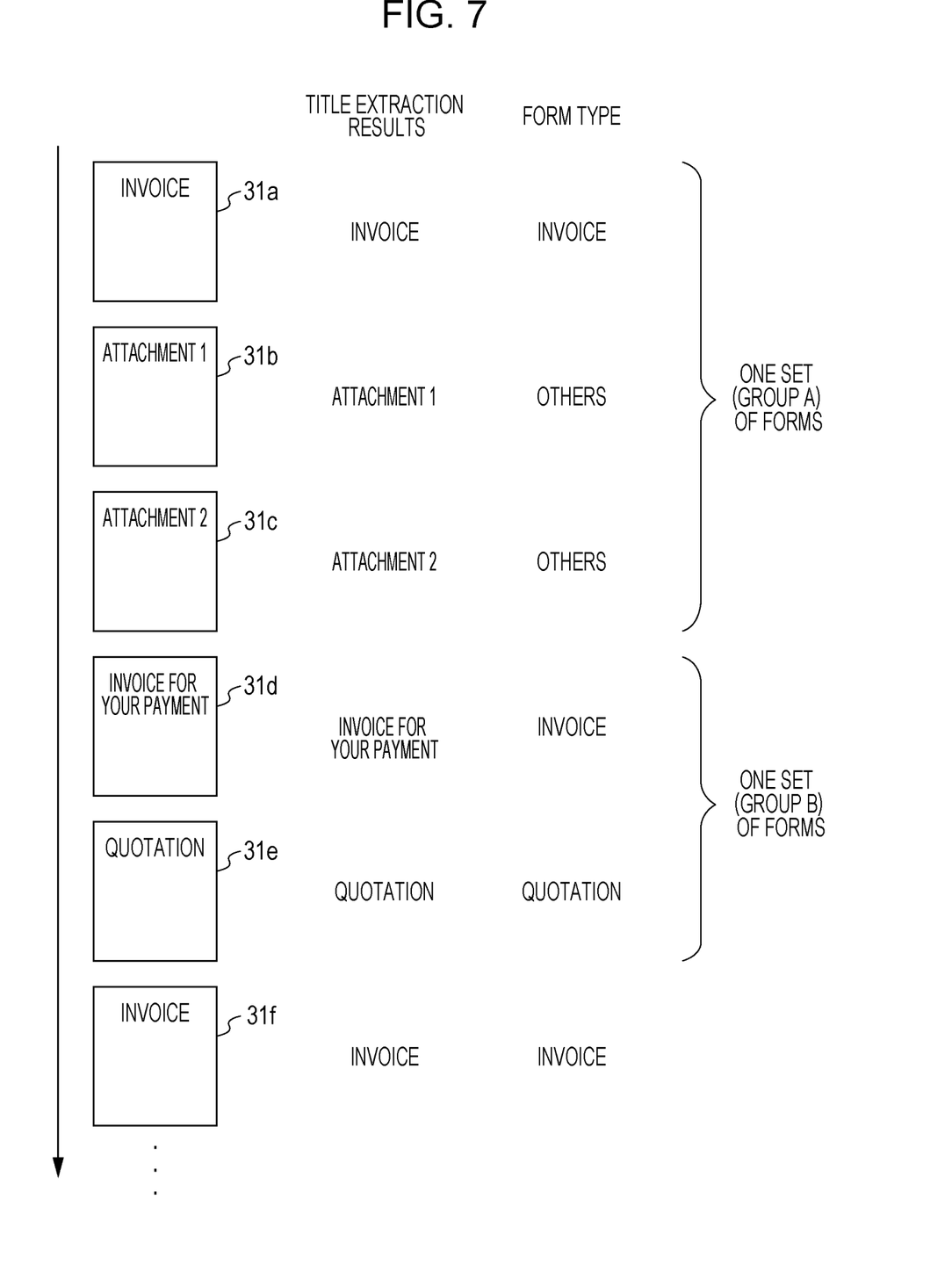
FIG. 7 illustrates multiple forms read by a scanner and related information concerning each form in the second exemplary embodiment.

FIG. 7 illustrates forms 31a through 31f to be continuously read. The titles extracted from the individual forms 31a through 31f are also illustrated as "title extraction results" in association with the forms 31a through 31f. Form types identified from the forms 31a through 31f are also shown. For example, the title of the form 31b is "attachment 1", which does not correspond to any of the titles set in the form type information, and the type of form 31b is classified as "others". The type of form 31c is also classified as "others". The types of forms 31a, 31d, 31e, and 31f are identified in accordance with the association between the form types and the titles set in the form type information.

It is now assumed that a user has selected "invoice" on the form-type selecting screen so as to sort multiple forms into groups based on the form type "invoice". The type of form 31a is "invoice", and after the form 31a is processed, a new group ("group A", for example) is generated in step S204, and the form 31a is registered in the group A in step S205. Currently, the group A is a subject group in which forms after the form 31a will be registered.

The type of subsequent form 31b is "others", which is not an invoice. In step S205, the form 31b is thus registered in the group A, which is the group of the form 31a processed immediately before the form 31b. The form 31c is also registered in the group A.

The type of subsequent form 31d is "invoice", and after the form 31d is processed, a new group ("group B", for example) is generated in step S204, and the form 31d is registered in the group B in step S205. Currently, the group B is a subject group in which forms after the form 31d will be registered. The type of subsequent form 31e is "quotation", which is not an invoice. In step S205, the form 31e is thus registered in the group B, which is the group of the form 31d processed immediately before the form 31e.

As stated above, even among forms sorted into the same group, each form is processed in accordance with its form type. For example, among the forms 31a, 31b, and 31c of the group A, the field value extractor 14 extracts a field value from each of the forms 31b and 31c in accordance with the definition information set for "others" instead of that for "invoice". For the forms 31d and 31e of the group B, the field value extractor 14 extracts a field value from the form 31e in accordance with the definition information set for "quotation" instead of that for "invoice".

The type of subsequent form 31f is "invoice", and a new group ("group C", for example) is generated in step S204. At this point, it is determined that the group B is constituted only by the forms 31d and 31e.

Figure 8:
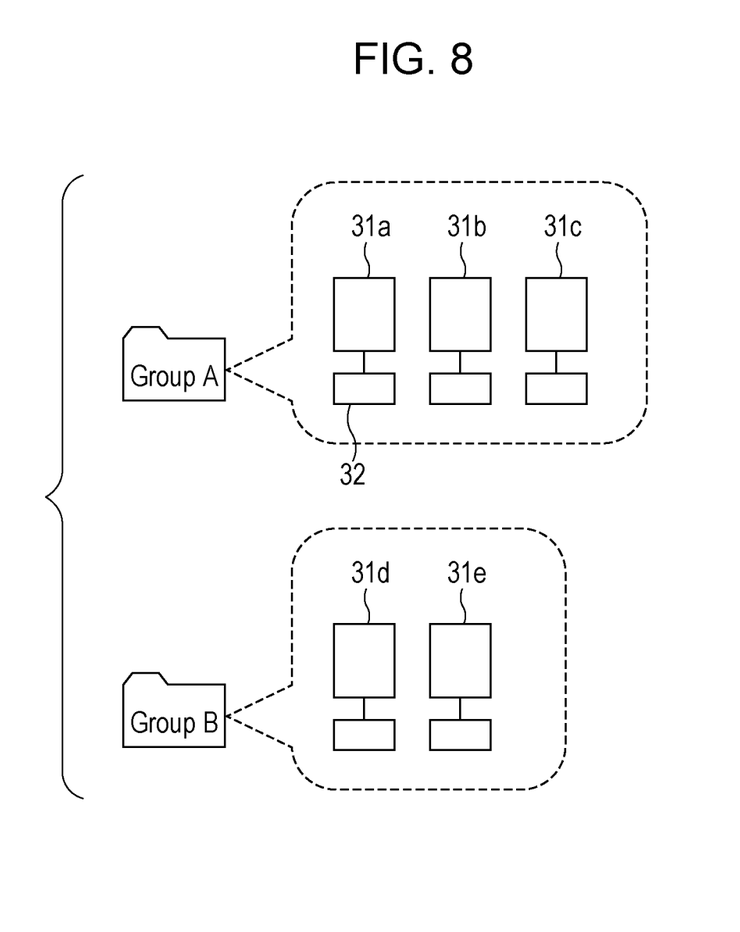
FIG. 8 is a conceptual view illustrating forms sorted and stored in folders.

FIG. 8 is a conceptual view illustrating the forms shown in FIG. 7 stored in folders. As shown in FIG. 8, the forms 31a, 31b, and 31c are sorted into the group A, while the forms 31d and 31e are sorted into the group B. Field value information generated by the field value extractor 14 is linked with each of the forms 31a through 31f, as indicated by the linkage between the form 31a and field value information 32 by way of example.

In the second exemplary embodiment, after a form type is selected, multiple forms are sorted into groups based on the form types of the read forms.

In the second exemplary embodiment, a user selects a form type ("invoice" in the above-described example), which serves as a sorting reference, in step S201. If a user has not selected a form type, the form sorting processor 19 may sort forms into groups according to the form type and store them. That is, groups are generated by form type, such as invoice, quotation, and others, and the forms are sorted into the corresponding groups.

The first and second exemplary embodiments have been described by taking a form as an example of a document. However, any documents that can be classified as plural categories may be used.

The first and second exemplary embodiments have been described by assuming that the information processing apparatus according to an exemplary embodiment of the disclosure is included in the image forming apparatus 10. However, the information processing apparatus may be disposed separately from the image forming apparatus 10 if it is able to obtain the read image of a form from the image forming apparatus 10. The information processing apparatus may alternatively be implemented by the cloud 30. Additionally, some of the processing functions of the image forming apparatus 10, such as the image analyzer 12, among the processing functions shown in FIGS. 1 and 5, may be executed by another information processing apparatus.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
extract a title from a read image of a document, wherein the title corresponds to a category of the document and the category of the document is one of a plurality of categories of documents,
determine a document type of the document by using the category of the document, wherein the document type includes the plurality of categories of documents and is one of a plurality of document types,
classify the document as the document type determined,
extract a field value from the document by using definition information that is predetermined in accordance with the document type determined, wherein the field value comprises a character string, the definition information is for each of the plurality of document types but not the plurality of categories of documents and the definition information defines a rule for extracting a field value from the document,
continuously obtain read images of a plurality of documents and individually determine document types of the plurality of documents one by one, and
execute document sorting for the plurality of documents based on the document type determined for the individual documents, wherein the plurality of documents are sorted into groups that are created based upon the document types determined.

2. The information processing apparatus according to claim 1, wherein the document type is determined by reference to document type classification information after the title of the document is extracted, the document type classification information being formed by associating a predetermined document type and a title to be classified as the predetermined document type with each other.

3. The information processing apparatus according to claim 2, wherein:
the title indicated by the document type classification information is a title of a category of a document that is classified as the document type; and
the document type includes at least an order sheet, an invoice, and a receipt.

4. The information processing apparatus according to claim 1, wherein
a first document type of the plurality of document types is selected for the document sorting, and
a plurality of continuous documents are sorted so that sets of group are defined as documents in a range from
a document of the first document type until
a document immediately before another document of the first document type or an end of the documents is reached without any more documents of the first document type being found.

5. The information processing apparatus according to claim 1, wherein each of documents sorted into a group is individually subjected to processing in accordance with a document type determined for the corresponding document.

6. The information processing apparatus according to claim 4, wherein each of documents sorted into a group is individually subjected to processing in accordance with a document type determined for the corresponding document.

7. A non-transitory computer readable medium storing a program causing a computer to execute a process, the process comprising:
extracting a title from a read image of a document, wherein the title corresponds to a category of the document and the category of the document is one of a plurality of categories of documents,
determining a document type of the document by using the category of the document, wherein the document type includes the plurality of categories of documents and is one of a plurality of document types,
classifying the document as the document type determined,
extracting a field value from the document by using definition information that is predetermined in accordance with the document type determined, wherein the field value comprises a character string, the definition information is for each of the plurality of document types but not the plurality of categories of documents and the definition information defines a rule for extracting a field value from the document,
continuously obtaining read images of a plurality of documents and individually determining document types of the plurality of documents one by one, and
executing document sorting for the plurality of documents based on the document type determined for the individual documents, wherein the plurality of documents are sorted into groups that are created based upon the document types determined.

8. An information processing apparatus comprising:
means for extracting a title from a read image of a document, wherein the title corresponds to a category of the document and the category of the document is one of a plurality of categories of documents,
means for determining a document type of the document by using the category of the document, wherein the document type includes the plurality of categories of documents and is one of a plurality of document types,
means for classifying the document as the document type determined,
means for extracting a field value from the document by using definition information that is predetermined in accordance with the document type determined, wherein the field value comprises a character string, the definition information is for each of the plurality of document types but not the plurality of categories of documents and the definition information defines a rule for extracting a field value from the document,
means for individually determining document types of a plurality of documents one by one when read images of the plurality of documents are continuously obtained, and
means for executing document sorting for the plurality of documents based on the document type determined for the individual documents, wherein the plurality of documents are sorted into groups that are created based upon the document types determined.

9. An information processing apparatus comprising:
a processor configured to
extract a title from a read image of a document, wherein the title corresponds to a category of the document and the category of the document is one of a plurality of categories of documents,
determine a document type of the document by using the category of the document, wherein the document type includes the plurality of categories of documents and is one of a plurality of document types, classify the document as the document type determined, extract a field value from the document by using definition information that is predetermined in accordance with the document type determined, wherein the field value comprises a character string, the definition information is for each of the plurality of document types but not the plurality of categories of documents and the definition information defines a rule for extracting a field value from the document, continuously obtain read images of a plurality of documents and individually determine document types of the plurality of documents one by one, sort the plurality of documents into folders based on the document types determined for the individual documents, and associate the folders, the plurality of documents that are sorted and the field value extracted from each of the plurality of documents with each other.

* * * * *